O. LOOK.
Carriage Wheel.
No. 94,325.
Patented Aug. 31, 1869.
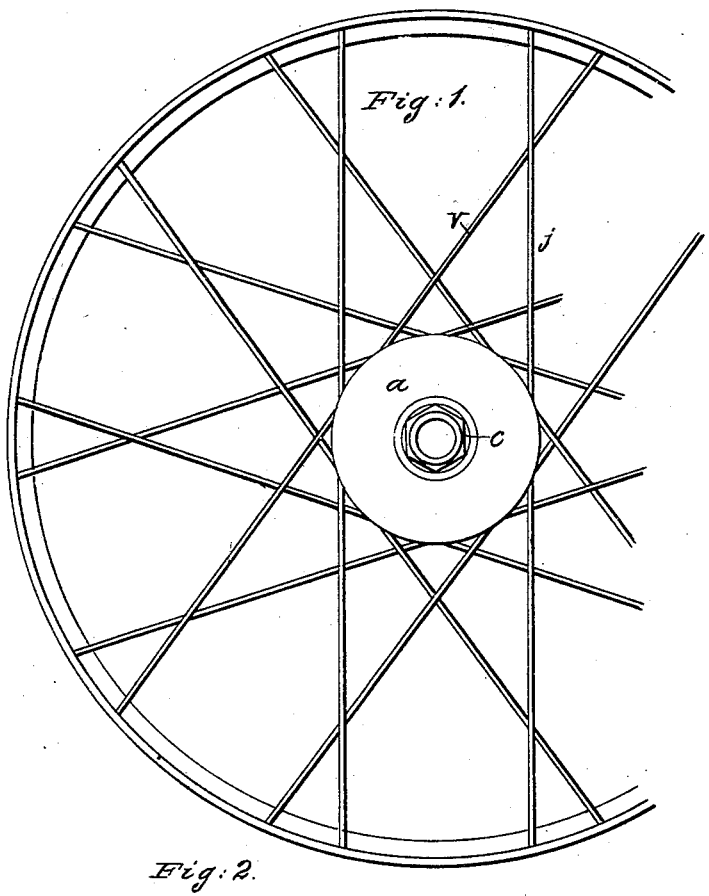
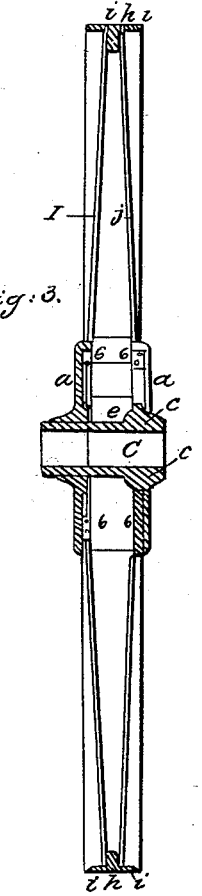
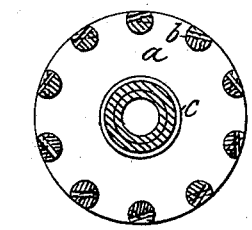
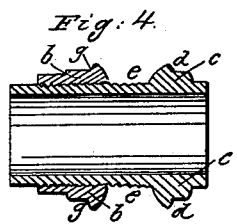
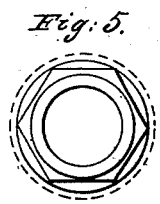
Witnesses:
Robert Kimpson
Laura Hubbell.
Inventor:
Obed Look.

UNITED STATES PATENT OFFICE.

OBED LOOK, OF BRIDGEPORT, CONNECTICUT.

IMPROVED CARRIAGE-WHEEL.

Specification forming part of Letters Patent No. 94,325, dated August 31, 1869.

*To all whom it may concern:*

Be it known that I, OBED LOOK, of Bridgeport, county of Fairfield, State of Connecticut, have invented certain new and useful Improvements in Carriage, Driving, and Toy Wheels and Pulleys; and I hereby declare the following to be a clear and exact description of the same, reference being had to the accompanying drawings, making a part of this specification, in which—

Figure 1 is a front view of same; Fig. 2, longitudinal section of hub; Fig. 3, transverse section of wheel; Fig. 4, latitudinal section of hub and screw; Fig. 5, end of same; Fig. 6, view of eyes for spoke on strap.

To enable others skilled in the art to make and use my invention, I will describe its construction.

First, I have two circular disks or plates, $a$, Fig. 1, of iron or other metal. On opposite sides of these disks I set eyes $b\,b$, Figs. 2 and 3. These can be cast; or I can secure them by other mechanical means. These eyes have the holes so arranged that one or the other alternates, so that the spokes will overlap each other without short curves or crooks. I then fit these disks on a shaft or holder, $e$, Figs. 3 and 4. If for a carriage-wheel, I have a box-shaft, the bore same as usual on ordinary carriage-axles. On the outside disk I have the shoulder $g'$, Fig. 4, at $c$. I cut a thread and fit nut $b$, Fig. 4, with shoulder $g$, Fig. 4, to operate disk. If I wish to use the wheel for a driving-pulley, I fit the disk against shoulder $d$, Fig. 4, and key it firmly to main shaft. I then fit the nut $b$, Fig. 4, to act against the opposite disk. I then take any of the ordinary fellies and tires of carriage-wheels; or I can have a tire or rim rolled to the form $h$, Fig. 3, or if I wish to apply my invention to driving wheels or pulleys, I have a rim cast without arms. Through the center of this rim I drill the holes $i\,i$, Fig. 3, setting them out on the periphery, so that they will bring the hub central. I countersink these holes on the periphery. Through these holes on one side I run the spokes or rods $j\,j$, Fig. 3, then through the eyes of disk, thence across to the opposite side of rim and through the holes, these spokes being set so that they stand each side of the direct center. I then strain these spokes or rods $j\,j$ to a direct line without depressing the circle of the rim, and rivet the ends down into the countersink. I can also have a shoulder formed on each end of the rod of sufficient length to allow for the thicknesses of rim, and then rivet down the end, the disks of hub being as close together as possible to enable the spoke to be as nearly a direct line from rim to rim as possible. I can also make a toy wheel or hoop by using strings or wire for the rods, and using the same arrangement to hub, with handle to steady the wheel. When all the spokes have been set, I strain them apart in center by the nut-screw $b\,b$, Fig. 4, and disk $a$ to a sufficient tension and angle to give strength to the wheel, as well as to act as braces from hub to rim.

The advantages of my invention are as follows: First, the use of one nut and screw to strain all the rods at one operation, thereby lessening greatly the liability of the nuts working loose, threads stripping and breaking off, so common with the old plan of a nut and thread to every rod or spoke at its juncture with hub; second, the advantages of a continuous rod or spoke from side to side of rim set each side of hub and running free in the eye of disk, thereby permitting the equal tension of the rod by its free action of same, and the hub finding a perfect center by the equal action of rods; third, the spokes or rods being set out on the periphery of hub-disk, and receiving the weight and sudden jar on the horizontal rods instead of the vertical ones, renders the wheel more durable and less likely to wear from sudden jolts and jars than there was in the old method when the rods run direct to the center or to an eye on the periphery of hub, thereby receiving all the jars in a direct and rigid manner; fourth, I can construct a rim in such a form that I can dispense with wood fellies, now indispensable in carriage-wheels; fifth, the ease with which I can strain the wheel back to its proper tension when slackened by use.

What I claim as my invention, and desire to secure by Letters Patent, is—

1. The continuous rods or spokes $j\,j$, connected from opposite sides of rim $h\,h$, in combination with disks $a$ and rim $h$, for the purpose specified and set forth.

2. The disk-hub $a$, nut $b$, ears $f$, screw $c$, rods $j\,j$, rim $h$, arranged as specified.

OBED LOOK.

Witnesses:
ROBERT KIMPSON,
LAURA HUBBELL.